United States Patent [19]

Lee

[11] 4,333,046
[45] Jun. 1, 1982

[54] POWER FACTOR CONTROL OF A THREE-PHASE INDUCTION MOTOR

[75] Inventor: Maw H. Lee, Broadview Heights, Ohio

[73] Assignee: The Scott & Fetzer Company, Lakewood, Ohio

[21] Appl. No.: 127,441

[22] Filed: Mar. 5, 1980

Related U.S. Application Data

[63] Continuation-in-part of Ser. No. 66,523, Aug. 15, 1979, abandoned.

[51] Int. Cl.³ ............................................. H02P 7/18
[52] U.S. Cl. .................................. 323/231; 318/729; 318/798; 318/812; 323/910
[58] Field of Search ............... 318/729, 798, 799, 800, 318/805, 812; 307/318, 321; 323/231, 910; 363/125, 126, 45

[56] References Cited

U.S. PATENT DOCUMENTS

| | | | |
|---|---|---|---|
| 3,253,202 | 5/1966 | Cotton | 318/756 |
| 3,346,795 | 10/1967 | Linke | 318/812 |
| 4,052,648 | 10/1977 | Nola | 318/812 |
| 4,072,880 | 2/1978 | Oshima et al. | 318/781 |
| 4,151,453 | 4/1979 | Suzuki et al. | 318/812 |
| 4,176,307 | 11/1979 | Parker | 318/812 |
| 4,190,793 | 2/1980 | Parker et al. | 318/800 |

OTHER PUBLICATIONS

Designing Solid-State Power Supplies, Seippel and Nelson, American Technical Society, 1975, pp. 20-29.

Primary Examiner—Gene Z. Rubinson
Attorney, Agent, or Firm—Pearne, Gordon, Sessions, McCoy & Granger

[57] ABSTRACT

First and second input currents to a three-phase AC induction motor of either delta or wye winding configuration are directly regulated by a pair of phase-triggered, gate-controlled, semiconductor switches series-inserted between the motor and two phases of its three-phase AC power source, the third input current being the Kirchoff resultant of the two regulated input currents. The half-cycle firing points or firing angles of the gate-controlled switches are varied together to apply more or less power to the motor as a function of mechanical load to optimize the power factor of the motor. Voltage imbalances in the motor windings caused by directly regulating only two of three input currents are tolerable due to the current limiting effect of the gate-controlled switches when the induction motor is at less than full mechanical load, such current limiting minimizing heat losses ($I^2R$) caused by the voltage imbalance condition.

5 Claims, 7 Drawing Figures

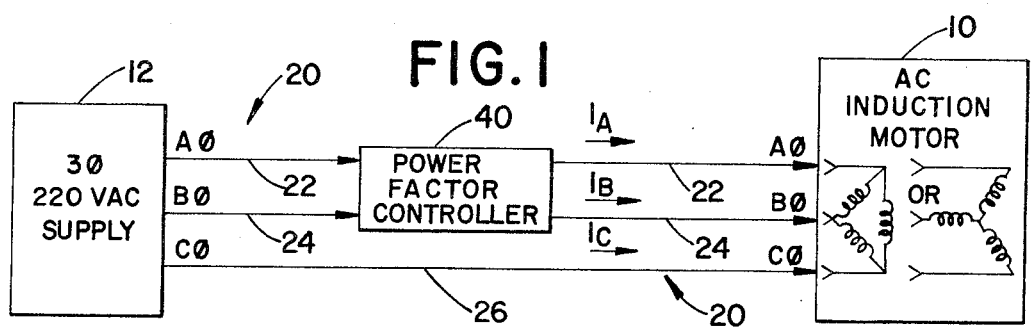
FIG.1
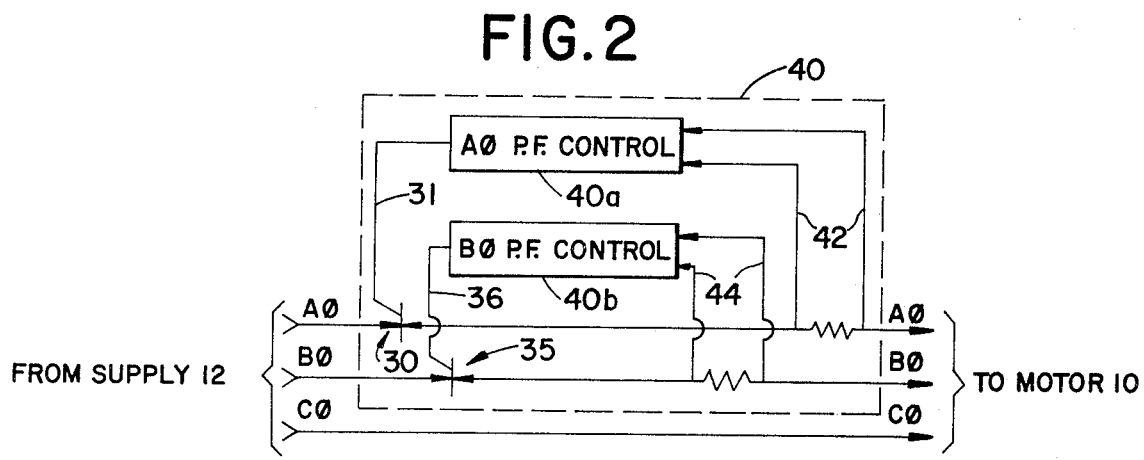
FIG.2
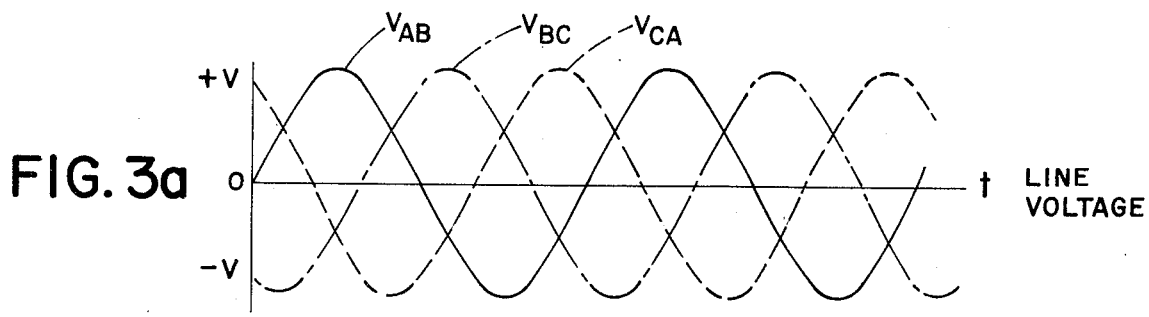
FIG.3a
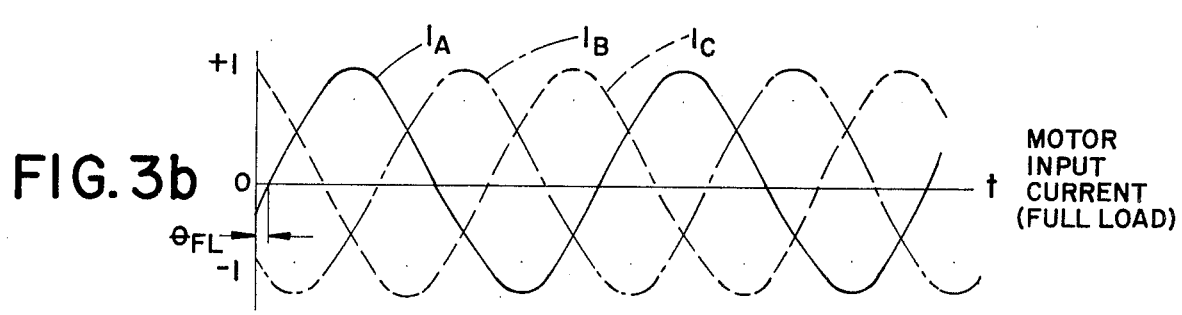
FIG.3b
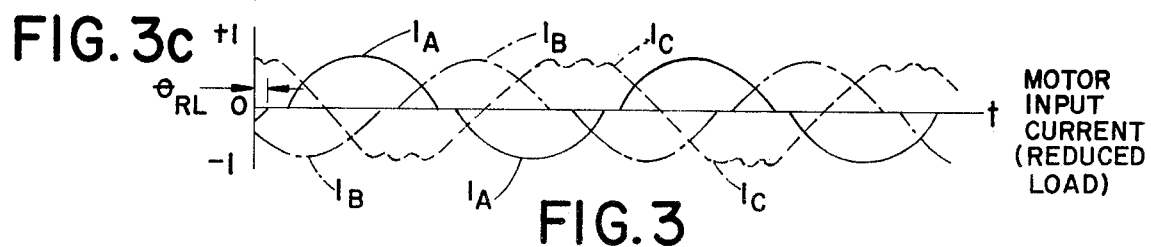
FIG.3c
FIG.3

POWER FACTOR CONTROL OF A THREE-PHASE INDUCTION MOTOR

This application is a continuation-in-part of the earlier-filed application Ser. No. 66,523 filed Aug. 15, 1979, now abandoned.

BACKGROUND OF THE INVENTION

This invention relates in general to electronic motor controllers, and in particular to a method and means for applying more or less power to a polyphase AC induction motor as a function of a varying mechanical load on such motor whereby its power factor is optimized.

U.S. Pat. No. 4,052,648 to Nola discloses a control system for optimizing the power factor of a less than fully loaded AC induction motor. While the patentee directs his disclosure primarily to single-phase motor control, the application of his invention to three-phase motor control is briefly discussed wherein the patentee notes that three of his power factor control systems would be needed, i.e., a separate power factor control system for each phase. The patentee points out that such a three-phase application of his invention to a wye winding type motor would necessitate the provision by such motor of a fourth wire neutral. In the United States, most three-phase induction motors are of the wye winding type and a majority of these lack an external fourth wire neutral. Identifying the neutral point in the winding of such a motor to provide for a fourth wire neutral is extremely difficult, time-consuming, and impractical. The patentee further points out that delta winding type motors would have to be modified to include a semiconductor switch and a current sampling resistor in series with each of the three delta-winding legs. Such redundant systems and additional requirements for three-phase induction motor control undesirably complicate the achievement of improved power factor at reduced load conditions.

SUMMARY OF THE INVENTION

The present invention optimizes the power factor of a less than fully loaded polyphase induction motor, such as a three-phase AC induction motor of delta or wye winding configuration, by directly regulating all but one of the input phase currents to the motor, the non-directly regulated input phase current being the Kirchoff resultant of the directly regulated phase currents.

In a preferred form of three-phase AC induction motor control, a pair of phase-triggered, gate-controlled, semiconductor AC switches are series-inserted between the motor and two of the three phases of the AC supply. The two switches are cycled between conducting and non-conducting condition to modulate or directly regulate two of the three input phase currents in a known manner so as to reduce the power applied to the motor as its mechanical loading is decreased. The third non-directly modulated input phase current, being the Kirchoff resultant of the two directly modulated input phase currents, is also reduced.

Because of the reduced current through the motor at less than full load conditions, voltage imbalances in the motor windings caused by directly regulating only two of the three phase currents are tolerable from an $I_2R$ loss standpoint. The present invention readily permits power factor control of a polyphase AC induction motor in a simple and straightforward manner without internal modification to the motor, a device embodying the present invention simply being series-inserted between the motor and its power source.

Further in accordance with the present invention, a simple and inexpensive power supply is provided to energize control circuit means for regulating only two of the three phase currents as noted above.

BRIEF DESCRIPTION OF THE DRAWING

FIG. 1 is a general schematic representation of an application of the invention to a three-phase AC induction motor power factor control circuit;

FIG. 2 is a more detailed, schematic representation of an embodiment of the power factor control circuit generally illustrated in FIG. 1;

FIGS. 3a–3c are graphical representations of selected waveforms generated by the circuit illustrated in FIG. 2;

DETAILED DESCRIPTION OF THE PREFERRED EMBODIMENT

Figure 4:
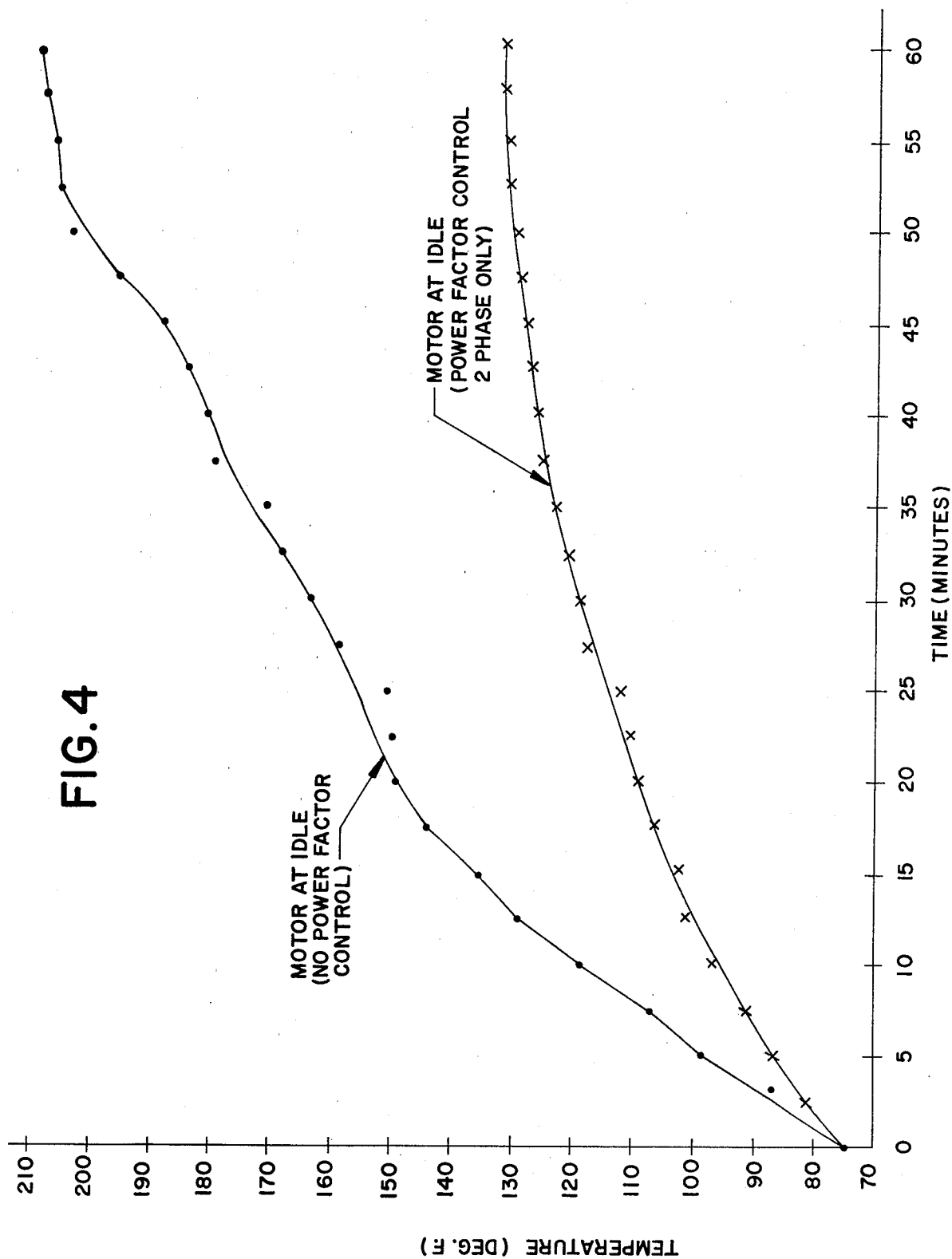
FIG. 4 is a graphical representation of the thermal characterisics of a typical motor controlled in accordance with the present invention.

Turning to the drawings, and in particular to FIGS. 1 and 2, a polyphase induction motor control system in accordance with the present invention is illustrated in preferred form as including a conventional three-phase AC induction motor 10 of either delta or wye winding configuration, such wye winding configuration not providing an external neutral return wire (fourth wire) to the motor power source. The induction motor 10 could, for example, be of the capacitor start type in a power range of approximately 5–10 h.p. operable at 60 hertz, 220 volts AC phase-to-phase. The motor 10 is coupled by appropriate mechanical means (not illustrated) to drive a varying mechanical load, for example, a small punch press wherein the motor is in either an idling condition or a near full load condition.

It is well known in the art that a fully powered idling AC induction motor of the type discussed tends to have an unacceptably low power factor, resulting in undesirable heat losses caused by reactive currents. It is further known that such a motor exhibits a higher power factor at or near full load conditions. In other words, an induction motor of the type illustrated operates more efficiently from a power factor standpoint only at or near a full load condition unless provisions are made to reduce power application to the motor when it is not fully loaded, such reduced power application inherently increasing the power factor of the motor, as is known in the art as represented by the earlier-noted Nola patent.

The induction motor 10 is provided with power via a three-wire buss 20, including a first phase (A-phase) current supply wire 22, a second phase (B-phase) current supply wire 24, and a third phase (C-phase) current supply wire 26. The buss 20 is of conventional design and serves to transfer power from, for example, a three-phase, 60 hertz, 220 volt AC supply 12 having a phase rotation of ABC, to the induction motor 10.

At full load conditions, when the induction motor 10 requires all available power from the supply 12, full or near full sinusoidal phase-to-phase voltages from the supply are applied for maximum torque output from the motor 10. When the induction motor undergoes a predetermined degree of reduced loading, the power from the supply 12 to induction motor 10 is reduced by a closed loop feedback control type system in the preferred form of a power factor controller 40 of, for example, the types illustrated by U.S. Pat. No. 4,052,648, as noted earlier, or pending U.S. application Ser. No. 042,608, filed May 25, 1979, now abandoned, by the present inventor, both the noted patent and pending application each being herein incorporated in its entirety by reference.

Figure 5:
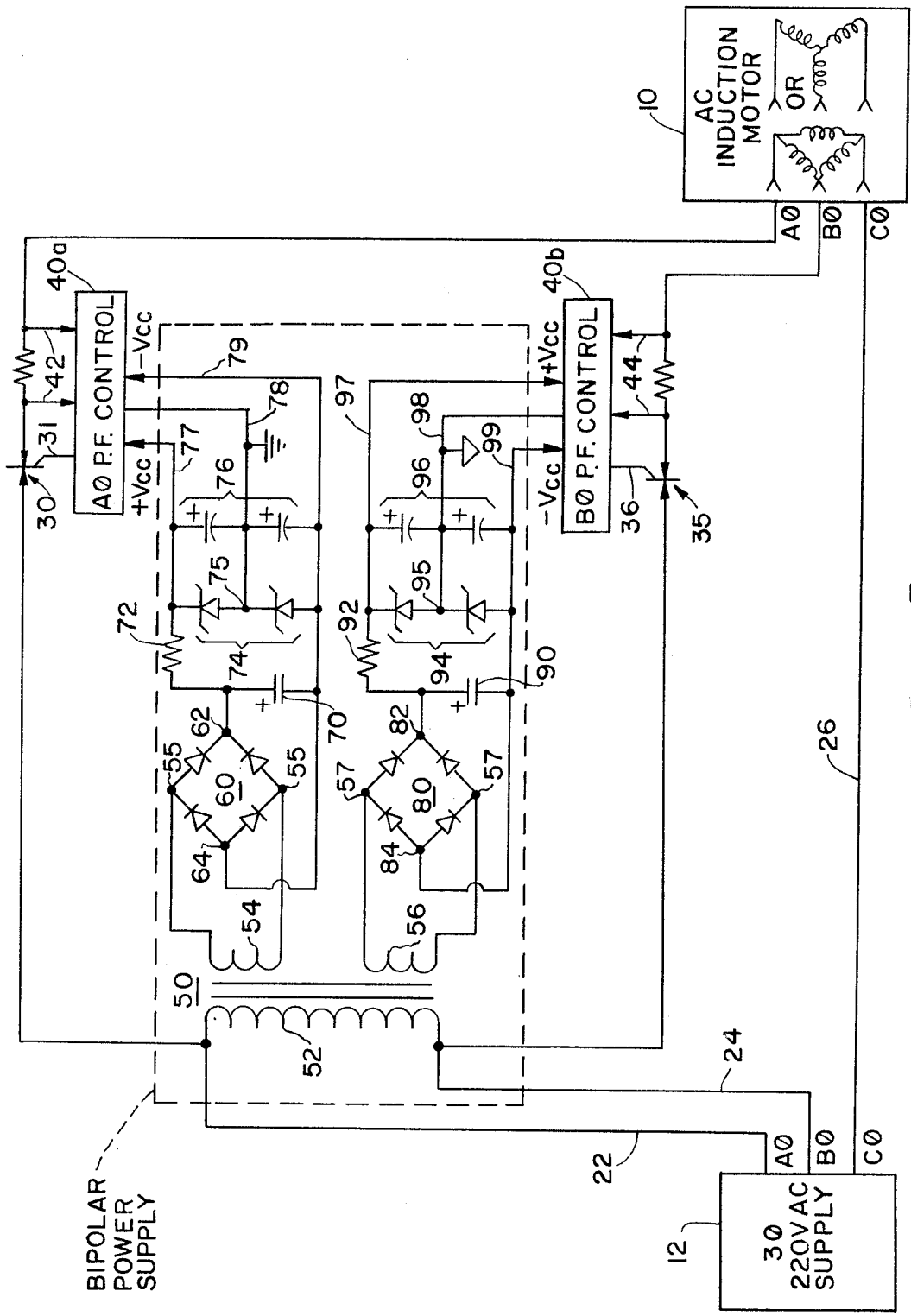
FIG. 5 is a schematic representation of a power supply for energizing a pair of power factor control circuits utilized in accordance with the present invention.

In accordance with the present invention, and with particular reference to FIG. 2, only two (A-phase, B-phase) of the three input currents to the three-phase AC induction motor are directly regulated or modulated by a pair of phase-triggered, gate controlled semiconductor AC switches in the preferred form of a first Triac switch 30 and a second Triac switch 35 (Triac is a trademark of The General Electric Company, of Syracuse, N.Y.), each series inserted into or in series with one of the wires of the power supply buss 20. The first Triac switch 30 is connected in series with or is series-inserted into the first phase current supply wire 22, while the second Triac switch 35 is connected in series with or is series-inserted into the second phase current supply wire 24. The power factor controller 40, as illustrated by FIG. 2, is of the type disclosed by the earlier incorporated U.S. patent application of the present inventor and includes an A-phase power factor control circuit 40a and a B-phase power factor control circuit 40b. The control circuits 40a and 40b are respectively provided with a first or A-phase input current control signal 42 and a second or B-phase input current control signal 44 in accordance with the teachings of the incorporated patent application reference. The input control signals 42, 44 (generated by load current sampling resistors as illustrated) are indicative of A-phase and B-phase load currents, and in particular the trailing edges of the load current pulses for each of the two controlled phases. The incorporated patent application describes in detail the closed loop control of a Triac switch, such as switches 30, 35, via respective gating signals on lines 31, 36, which phase trigger the switches 30, 35 to reduce the line voltage applied to the motor 10. The controllers 40a and 40b, as illustrated by the incorporated patent application reference, each require a bipolar power DC supply ($\pm 12$ VDC) with isolated grounds or return paths. In accordance with the invention, such a suitable power supply is illustrated in FIG. 5 and will be discussed in detail subsequently.

It is clearly contemplated by the present inventor that other closed loop control systems, including a modified system of the type taught by the noted Nola patent, could be utilized to meet the requirement of the power factor controller 40.

As noted earlier, the present invention teaches the utilization of a power factor controller 40 for only two of the three phase currents supplied to the induction motor, the third input current being the Kirchoff resultant of the two regulated input currents, the Kirchoff current law holding that the current flowing to a given point or node in a circuit is equal to the current flowing away from that point or node at any time. That is, the three-phase alternating currents $I_A$, $I_B$, $I_C$ flowing to and from the motor 10 via the three-wire buss 20 must equal zero at any point in time at a common circuit node, such as the motor 10. Thus, it is clear that a reduction of the applied current via the A and B phase wires 22, 24 necessarily forces a reduced current in the non-directly regulated C phase current applied via supply wire 26, the half cycle firing points or firing angles of the gate control switches 30, 35 being varied together to apply less power (increased firing angle) to the motor as its mechanical loading is reduced, thereby optimizing the power factor, as discussed in detail by the heretofore incorporated references.

By directly regulating only two of the three phase currents supplied to the induction motor 10, voltage imbalances in the motor windings are tolerable due to the current limiting effect of the gate control switches 30, 35. At full load conditions, the switches 30,35 are, in effect, substantially short-circuited (or switched at the zero crossing point of their respective line voltages) to apply full sinusoidal, balanced three-phase power to the motor, the resultant load currents also being sinusoidal. At reduced load conditions, wherein the Triac switches 30, 35 are firing a predetermined or fixed period of time after the zero crossing points of their respective phase voltages, the input currents, while not purely sinusoidal, are fundamentally sine wave functions with minimal high frequency components.

Turning to FIG. 3, waveform 3a represents the three phase-to-phase line voltages $V_{AB}$, $V_{BC}$, $V_{CA}$ of the conventional supply 12 (see FIG. 1). When the induction motor 10 is fully loaded, wherein its maximum power output is desirable, full three-phase line voltage, as illustrated in waveform 3a of FIG. 3, is applied to the motor to provide the full load input currents $I_A$, $I_B$, $I_C$ illustrated in waveform 3b. At such full load condition, the three input currents $I_A$, $I_B$, $I_C$ lag their associated line voltages $V_{AB}$, $V_{BC}$, $V_{CA}$. Such lagging currents at full load are illustrated as having a lagging phase angle $\theta_{FL}$. Under such full load conditions $\theta_{FL}$ is small and considered acceptable. If the induction motor 10 is unloaded to operate at an idle condition, the three phase currents $I_A$, $I_B$, $I_C$ would lag their respective phase voltages to a considerable degree to drastically reduce the power factor (large phase angle) and increase reactive current losses. As taught by the earlier-noted incorporated references, the power factor can be controlled, i.e., it can be optimized, by reducing the voltage and hence the power to the motor by means of phase-triggered, Triac switches 30, 35 (FIG. 1) series-inserted between the induction motor 10 and the power supply 12.

The phase-to-phase load voltages, applied to the induction motor 10 when the gate control switches 30, 35 are firing on a half-cycle basis (120 Hz) in accordance with the general teachings of the incorporated references, are limited to a degree less than the available line voltage illustrated in waveform 3a. The effect of such limited line voltage application is illustrated in waveform 3c wherein the input currents are reduced to result in an optimum phase angle $\theta_{RL}$, which in turn provides an acceptable power factor and reduced reactive current losses.

The electrical energization of the three-phase AC induction motor 10 of either delta or wye winding configuration is provided in accordance with the present invention by directly modulating or regulating in a known manner the input currents of only two phases of the motor to reduce the power applied to the motor as its mechanical loading is decreased. The non-directly modulated or regulated input current of the third phase (C-phase) of the motor is the Kirchoff resultant, as illustrated by wave-form 3c, of the two directly modulated input currents. While the two regulated input currents $I_A$ and $I_B$ are both generally identical in form, the third non-directly regulated input current $I_C$ varies as the Kirchoff resultant of the two controlled input currents to provide a waveform having as a fundamental component a sine wave. It has been found by the present inventor that load voltage imbalances caused in the motor by regulating only two of the phase currents provided to the three-phase motor are tolerable ($I^2R$ loss) due to the current limiting effect of the gate control switches triggered in accordance with the teachings of either of the two incorporated references. As illustrated by FIG. 4, a typical enclosed three-phase AC induction motor idling under full line voltage power (balanced phase-phase voltages) will run hotter than an identical idling motor operating at reduced applied power under a voltage imbalance condition in accordance with the present invention.

Turning to FIG. 5, there is illustrated in accordance with the present invention a simple, low cost, bipolar power supply for energizing the power factor control circuits 40a, 40b, earlier discussed with regard to FIG. 2, such power factor control circuits 40a, 40b being of the type illustrated in applicant's incorporated pending application Ser. No. 042,608, filed May 25, 1979 by the present inventor. Such power factor control circuits each require energization by a bipolar power supply, i.e., a DC power supply providing positive DC voltage plus $V_{cc}$, a negative DC voltage $-V_{cc}$, and an isolated electrical neutral or ground relative thereto. Such electrically isolated power supply voltages for each of the power factor control circuits 40a, 40b are necessary to preclude undesirable cross-currents that would develop without such isolated power supply application.

As illustrated in FIG. 5, the three-phase 60 Hz, 220-volt AC supply 12 provides three phase currents via supply wires 22, 24 and 26. The phase current via wire 22 is supplied through the Triac switch 30, the illustrated current sampling resistor providing the input control signal 42, while the phase current via line 24 is supplied to the AC induction motor 10 via the Triac 35 and its related current sampling resistor providing the input signal 44.

In accordance with the present invention, a power supply step-down transformer 50 includes a primary winding, of generally high impedance to limit current draw therethrough, connected across supply wire 22 and 24, as illustrated, to sense a phase-to-phase voltage ($V_{AB}$) of the AC supply 12. The transformer 50 further includes a first voltage step-down secondary winding 54 and a second voltage step-down secondary winding 56, the windings being electrically isolated from each other as illustrated. The secondary windings 54,56 are generally identical in nature in that they are of generally equal impedance and supply a generally equal induced voltage as a result of primary winding energization.

A first rectifier means 60 has an AC input side connected to the secondary winding 54 via AC input terminals 55. A second rectifier means 80 is also provided having its AC input side connected to the second secondary winding 56 via a second set of AC input terminals 57 as illustrated. The rectifier means 60, 80 in the preferred illustrated form of full wave diode bridge rectifiers 60,80 are well known in the art and function to fully rectify the stepped-down AC voltage (60 Hz) across the secondary windings 54,56 to provide a pulsating (120 Hz) DC output voltage. The rectifier means 60 includes a first DC output terminal 62 and a first DC return terminal 64, while the second rectifier means 80 provides a second DC output terminal 82 and a second DC return terminal 84.

A first capacitor means 70, in the preferred illustrated form of an electrolytic capacitor, is connected in parallel across the terminals 62,64, the high side or positive end of the capacitor means 70 being connected to the first DC output terminal 62, the negative end of the capacitor means 70 being connected to the DC return terminal 64. Likewise, a second capacitor means 90, in the preferred illustrated form of an electrolytic capacitor, is connected in parallel across the terminals 82,84 with the high side or positive end of the capacitor means 90 being connected to the second DC output terminal 82, the negative end of the capacitor means 90 being connected to the DC return terminal 84. The capacitor means 70,90 function in a known manner to provide a generally stable DC voltage across their respective terminals, which correspond electrically to terminal pairs 62, 64, and 82, 84. The capacitor means 70,90 remove the ripple from the pulsating DC voltage provided by the rectifier means 60,80, the capacitor means 70,90 charging generally to the peak value of such pulsating DC voltages provided no heavy current requirements are placed on the charged capacitor means 70, 90.

A first pair of series-connected voltage-regulating Zener diodes 74 is connected in electrical parallel across the capacitor means 70 via a series-inserted current limiting resistor 72 which functions to limit current draw on the capacitor means 70 to enable it to maintain a generally stable DC voltage state generally equal to the peak value of the AC voltage provided by the secondary winding 54. It is noted that the voltage applied across the pair 74 is equal to at least a portion of the voltage of the charge capacitor means 70, the remaining voltage being dropped across the resistor 72. In practice, very little current is drawn through the resistor 72, wherein the voltage applied across the Zener diode pair 74 is approximately equal to the voltage across the charged capacitor means 70. The Zener diodes comprising the pair 74 are generally identical in operating characteristics and function in a known manner to break down in a reverse direction to provide a generally stable voltage drop, such as 12 volts DC. To provide for a bipolar output, that is, to provide for a positive DC voltage ($+V_{cc}$) and a negative DC voltage ($-V_{cc}$) relative to a common ground or neutral point, a first Zener pair midpoint 75 is provided. The Zener diode pair 74 functions in a known manner to provide a first positive DC supply voltage line 77 (connected to Zener pair cathode) and a first negative DC supply voltage line 79 (connected to Zener pair anode), such positive and negative DC supply voltages provided thereon being relative to the first isolated ground or neutral 78 connected to the Zener pair midpoint 75.

It can be seen that the A-phase power factor control circuit 40a is provided with the necessary positive and negative DC supply voltage lines 77, 79 and isolated ground line 78. To further enhance DC supply voltage stability, a pair of filter capacitors 76 can be provided in parallel across the Zener diode pair 74 with the series-connected capacitor midpoint being connected to the Zener pyramid points 75, as illustrated. Such capacitors serve to further filter the DC voltages across the Zener diodes comprising the pair 74 to enhance DC supply voltage stability.

It can further be seen that the lower portion of the power supply circuit illustrated in FIG. 5 functions in a like manner, as discussed immediately above, utilizing a second series-connected Zener diode pair 94 connected in electrical parallel relation across the second capacitor means 90 via another current-limiting resistor 92 to sense at least a portion of the voltage across the capacitor means 90. A second Zener diode pair midpoint 95 provides a second isolated ground line 98 relative to a second positive DC voltage supply line 97 (connected to Zener pair cathode) and a second negative DC voltage supply line 99 (connected to Zener pair anode). Further, a pair of filter capacitors 96 are provided to enhance DC supply voltage stability as noted above in discussing corresponding filter capacitors 76. It can be seen that the B-phase power factor control circuit 40b is effectively energized with a separate isolated supply constituted by the lines 97, 98 and 99, to permit effective firing of the Triac switch 35 in accordance the teachings of the present invention as earlier discussed.

It can be seen that a simple and effective bipolar power supply for supplying isolated power to the A-phase power control circuit 40a and the B-phase power factor supply circuit 40b has been provided.

It should be evident that this disclosure is by way of example and that various changes may be made by adding, modifying or eliminating details without departing from the fair scope of the teaching contained in this disclosure. The invention is therefore not limited to particular details of this disclosure.

What is claimed is:

1. In an electronic controller for regulating the power applied by a three-phase AC supply to a three-phase AC induction motor of delta or wye winding configuration, the controller including a pair of power factor control circuits each requiring a positive DC supply voltage, a negative DC supply voltage and an isolated ground, a bipolar supply comprising;

a transformer means having a primary winding connected to sense to a phase-to-phase voltage of the AC supply and a pair of voltage-stepdown secondary windings;

first and second rectifier means each having a DC output and a DC return, and an AC input connected to a respective one of the secondary windings;

first and second capacitor means connected across the DC output and the DC return of a respective one of the first and second rectifier means, the first and second capacitor means filtering the DC outputs of their respective rectifier means to each provide a generally steady state DC voltage;

a first series-connected pair of Zener diodes, the first pair connected to sense at least a portion of the steady DC voltage across the first capacitor means, one end of the series-connected first pair providing a first positive DC supply voltage, the other end of the series-connected first pair providing a first negative DC supply voltage, the midpoint of the first Zener diode pair providing a first electrical ground relative to the positive and negative DC supply voltages provided by the first Zener diode pair, the first positive and negative DC supply voltages and their respective first electrical ground being connected to energize one of the power factor control circuits; and a second series-connected pair of Zener diodes, the second pair being connected to sense at least a portion of the DC voltage across the second capacitor means, one end of the series-connected second pair providing a first positive DC supply voltage, the other end of the series-connected second pair providing a second negative DC supply voltage, the midpoint of the second Zener diode pair providing a second electrical ground relative to the positive and negative DC supply voltages provided by the second Zener diode pair, the second positive and negative DC supply voltages and their respective second electrical ground being connected to energize the other power factor control circuit.

2. A bipolar power supply according to claim 1 wherein the first and second rectifier means are each constituted by a full wave rectifier including four bridge-connected diodes.

3. A bipolar power supply according to claim 1, including filter capacitor means connected in electrical parallel relation with each of the Zener diode pairs.

4. A bipolar power supply according to claim 1, including a pair of current limiting resistors, one of the pair being connected in series beween the first filter capacitor and the first Zener diode pair, the other of the pair being connected in series between the second filter capacitor and the second Zener diode pair.

5. In an electronic controller for regulating the power applied by a three-phase AC supply to a three-phase AC induction motor of delta or wye winding configuration, the controller including a pair of power factor control circuits each requiring a positive DC supply voltage, a negative DC supply voltage and an isolated ground, a bipolar supply comprising:

a step-down transformer having a single high impedance primary winding connected to sense a phase-to-phase voltage of the AC supply and a pair of voltage step-down secondary windings electrically isolated from each other, the secondary winding each providing an AC voltage substantially less than that impressed across the primary winding, first and second full wave bridge rectifiers for providing pulsating DC voltage output in response to an AC voltage input, each providing a DC output terminal and a DC return terminal, the full wave bridge rectifiers each including an AC input connected to a respective one of the secondary windings providing AC voltage inputs to the bridge rectifiers;

first and second electrolytic capacitors each having a positive end and a negative end, the positive end of the first capacitor means being connected to the DC output terminal of the first bridge rectifier, the negative end of the first capacitor being connected to the DC return terminal of the first bridge rectifier, the positive end of the second capacitor means being connected to the DC output terminal of the second bridge rectifier, the negative end of the second capacitor being connected to the DC return terminal of the second bridge rectifier, the first and second capacitors filtering the pulsating DC voltage outputs provided by bridge rectifiers to provide generally steady state DC voltages;

a first series-connected pair of Zener diodes having a cathode end and an anode end, the first pair being connected to sense at least a portion of the steady state DC voltage across the first capacitor means, the cathode end of the first series-connected Zener diode pair being connected to the positive end of the first capacitor, the anode end of the first series-connected Zener diode pair being connected to the negative end of the first capacitor, the cathode end of the first Zener diode pair providing a first positive DC supply voltage, the anode end of the first Zener diode pair providing a first negative DC supply voltage, the midpoint of the first Zener diode pair providing a first electrical ground relative to the positive and negative supply voltages provided by the first Zener diode pair, the first positive and negative DC supply voltages and their respective first electrical ground being connected to energize one of the power factor control circuits, and a second series-connected pair of Zener diodes having a cathode end and an anode end, the second pair being connected to sense at least a portion of the steady state DC voltage across the second capacitor means, the cathode end of the second series-connected Zener diode pair being connected to the positive end of the first capacitor, the anode end of the second series-connected Zener diode pair being connected to the negative end of the second Zener diode pair providing a second positive DC supply voltage, the anode end of the second Zener diode pair providing a second negative DC supply voltage, the midpoint of the second Zener diode pair providing a second electrical ground relative to the positive and negative supply voltages provided by the second Zener diode pair, the second positive and negative DC supply voltages and their respective second electrical ground being connected to energize the other of the power factor control circuits.

* * * * *